(12) United States Patent
Hajduczenia

(10) Patent No.: US 11,496,305 B2
(45) Date of Patent: Nov. 8, 2022

(54) ITEM INTEGRITY VERIFICATION

(71) Applicant: Charter Communications Operating, LLC, St. Louis, MO (US)

(72) Inventor: Marek Hajduczenia, Castle Rock, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 547 days.

(21) Appl. No.: 16/580,570

(22) Filed: Sep. 24, 2019

(65) Prior Publication Data

US 2021/0091949 A1 Mar. 25, 2021

(51) Int. Cl.
*H04L 29/06* (2006.01)
*H04L 9/32* (2006.01)
*G11B 27/031* (2006.01)
*G06V 40/12* (2022.01)

(52) U.S. Cl.
CPC ............ *H04L 9/32* (2013.01); *G06V 40/1335* (2022.01); *G06V 40/1365* (2022.01); *G11B 27/031* (2013.01)

(58) Field of Classification Search
None
See application file for complete search history.

(56) References Cited

U.S. PATENT DOCUMENTS

| | | | |
|---|---|---|---|
| 7,143,290 B1 * | 11/2006 | Ginter | H04N 7/17309 713/193 |
| 10,250,381 B1 | 4/2019 | Rice | |
| 10,320,569 B1 * | 6/2019 | Wentz | H04L 9/3239 |
| 10,333,705 B2 * | 6/2019 | Smith | H04L 9/0637 |
| 10,360,668 B1 * | 7/2019 | McGregor | H04L 9/0637 |

(Continued)

FOREIGN PATENT DOCUMENTS

WO 2019/043379 A1 3/2019

OTHER PUBLICATIONS

Latypov, Rustam; Stolov, Evgeni. A new watermarking method to protect blockchain records comprising small graphic files. 2019 42nd International Conference on Telecommunications and Signal Processing (TSP), https://ieeexplore.ieee.org/stamp/stamp.jsp?tp=&arnumber=8769098 (Year: 2019).*

(Continued)

*Primary Examiner* — Jeremiah L Avery
(74) *Attorney, Agent, or Firm* — The Marbury Law Group, PLLC

(57) ABSTRACT

Various embodiments include processing devices and methods for integrity verification of a news item. A processor of a network element may obtain an electronic news item that is ready for publication, and may determine a fingerprint using one or more portions of the electronic news item. The processor may determine for the electronic news item a record including the determined fingerprint and a second fingerprint of a previous electronic news item. The processor may store the determined record in a publicly available digital ledger, embed the determined fingerprint in the electronic news item, and publish the electronic news item. A computing device may obtain the published news item and may use the embedded fingerprint in the record that is stored in the digital ledger to verify the integrity of the electronic news item.

24 Claims, 11 Drawing Sheets

(56) References Cited

U.S. PATENT DOCUMENTS

| | | | | |
|---|---|---|---|---|
| 10,361,866 B1* | 7/2019 | McGregor | ............ | H04L 9/0637 |
| 10,880,089 B2* | 12/2020 | Brown | ................ | H04L 9/3218 |
| 11,288,736 B1* | 3/2022 | Jette | .................... | H04L 9/0637 |
| 2019/0361917 A1* | 11/2019 | Tran | .................... | G06Q 20/308 |
| 2020/0075056 A1* | 3/2020 | Yang | ............... | G11B 20/10527 |
| 2020/0110821 A1* | 4/2020 | Chan | ................ | G06F 16/2379 |
| 2020/0380520 A1* | 12/2020 | Kavali | ................ | G06Q 20/02 |

OTHER PUBLICATIONS

Mthethwa, Sthembile et al. Proposing a Blockchain-based Solution to Verify the Integrity of Hardcopy Documents. 2018 International Conference on Intelligent and Innovative Computing Applications (ICONIC), https://ieeexplore.ieee.org/stamp/stamp.jsp?tp=&arnumber=8601200 (Year: 2018).*

* cited by examiner

ITEM INTEGRITY VERIFICATION

BACKGROUND

Digital publications are vulnerable to alteration and manipulation. Indeed, propaganda, misleading, and false news items (so-called "fake news") have become a major problem in the age of social media. More often than not, false, misleading, or modified information is spread on various social media platforms at an alarming rate, usually claiming to be coming from a reliable source such as a well-known mass media provider or news outlet. With no reliable way to track and verify the origin of a given publication, or to determine whether a news item has been altered or reformatted, fake news may spread unchecked. This results in the dissemination of potentially damaging misinformation, and ultimately undermining public trust in the news.

SUMMARY

Various aspects include methods that may be implemented on a processor of a computing device for verifying the integrity of a news item.

Various embodiments may include obtaining an electronic news item that is ready for publication, determining a fingerprint using one or more portions of the electronic news item, determining for the electronic news item a record including the determined fingerprint and a second fingerprint of a previous electronic news item, storing the determined record in a publicly available digital ledger, embedding the determined fingerprint in the electronic news item, and publishing the electronic news item.

Some embodiments may include adding to the news item one or more data tags that identify portions of the electronic news item used to determine the fingerprint. Some embodiments may include removing metadata from one or more media content items included in the electronic news item. In some embodiments, embedding the determined fingerprint in the electronic news item may include embedding the determined fingerprint in a text portion of the electronic news item. In some embodiments, embedding the determined fingerprint in the electronic news item may include embedding the determined fingerprint in a media content item of the electronic news item. Some embodiments may include determining a record identifier enabling the location of the determined record in the digital ledger, and embedding the determined record identifier in the electronic news item. In some embodiments, the determined fingerprint may be a hash value.

Various embodiments may include obtaining a published electronic news item, extracting an embedded fingerprint from the electronic news item, identifying one or more portions of the electronic news item usable to calculate a fingerprint of the electronic news item, calculating a fingerprint of the electronic news item using the identified portions, determining whether the embedded fingerprint and the calculated fingerprint match, determining whether the embedded fingerprint matches a fingerprint of the electronic news item stored in a publicly available digital ledger in response to determining that the embedded fingerprint and the calculated fingerprint match, and determining that the integrity of the news item is verified in response to determining that the embedded fingerprint matches the fingerprint of the electronic news item stored in the digital ledger.

In some embodiments, determining whether the embedded fingerprint matches the fingerprint of the electronic news item stored in a publicly available digital ledger may include determining a record identifier enabling the location of a record in the digital ledger corresponding to the electronic news item, and obtaining from the record in the digital ledger the fingerprint of the electronic news item stored in the digital ledger.

Some embodiments may include determining whether a previous record in the digital ledger is valid based on the fingerprint of the electronic news item and a fingerprint of the previous record, and determining that the integrity of the electronic news item is verified in response to determining that the previous record in the digital ledger is valid.

Some embodiments may include determining a fingerprint of a subsequent record in the digital ledger, determining whether the subsequent record in the digital ledger is valid based on the fingerprint of the electronic news item and the determined fingerprint of the subsequent record, and determining that the integrity of the electronic news item is verified in response to determining that the subsequent record in the digital ledger is valid. In some embodiments, the embedded fingerprint, calculated fingerprint, and the fingerprint of the electronic news item stored in the digital ledger may be hash values.

Various aspects further include a computing device having a processor configured with processor executable instructions to perform operations of any of the methods summarized above. Various aspects further include a processing device for use in a computing device and configured to perform operations of any of the methods summarized above. Various aspects include a computing device having means for performing functions of any of the methods summarized above. Various aspects include a non-transitory processor-readable storage medium having stored thereon processor-executable instructions configured to cause a processor of a computing device to perform operations of any of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Figure 1:
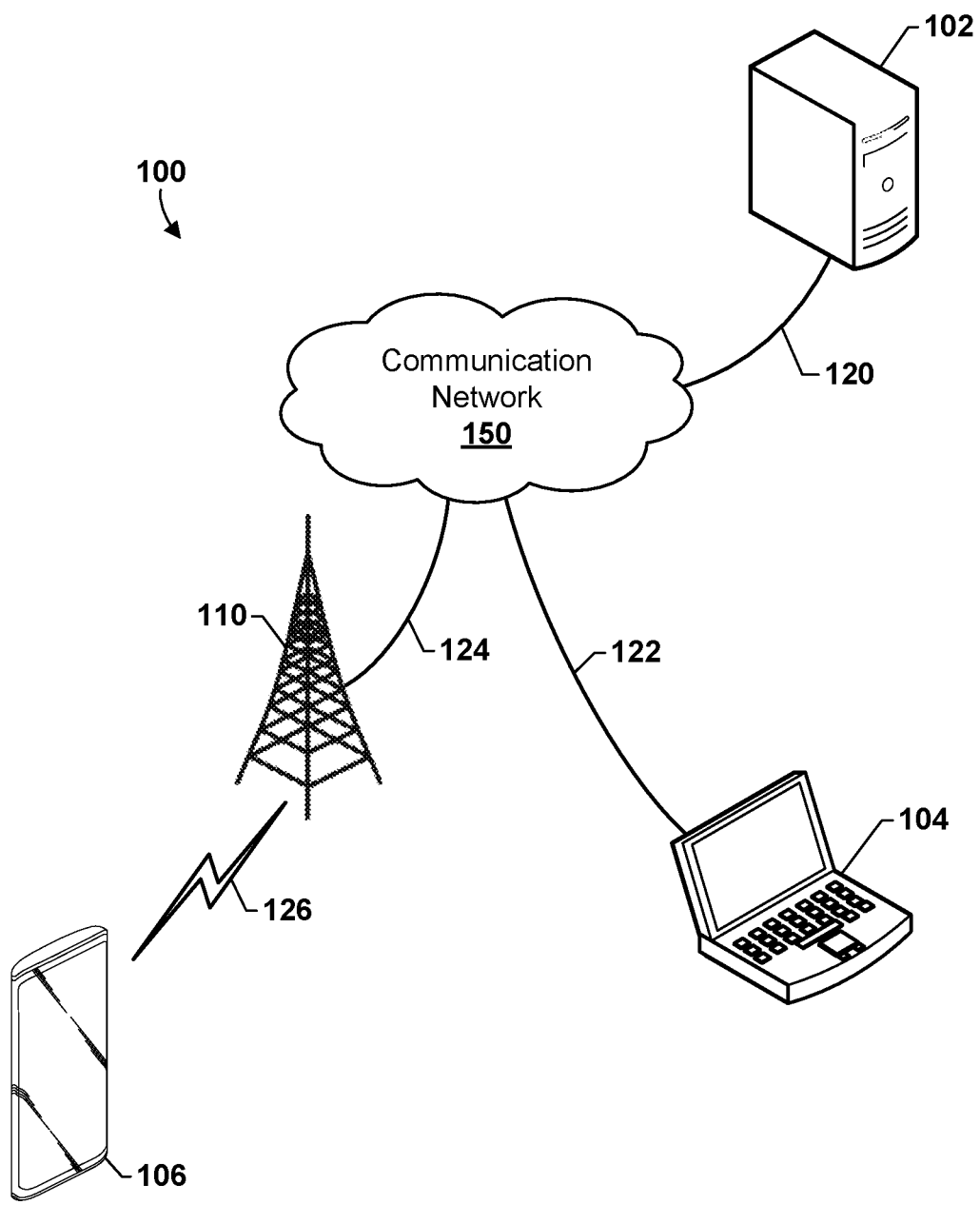
FIG. 1 is a system block diagram of a communication system according to various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

The term "computing device" is used herein to refer to any one or all of, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, cordless phones, network-connected displays (such as advertisement screens, news screens, and the like), wireless local loop (WLL) station, entertainment devices (for example, a music or video device, or a satellite radio), gaming devices, wireless gaming controllers, cameras, medical devices or equipment, biometric sensors/devices, wearable devices (such as smart watches, smart clothing, smart glasses, smart wrist bands, smart jewelry (for example, smart ring, smart bracelet)), smart meters/sensors, industrial manufacturing equipment, router devices, appliances, global positioning system devices, wireless-network enabled Internet of Things (IoT) devices including large and small machinery and appliances for home or enterprise use, wireless communication elements within autonomous and semiautonomous vehicles, a vehicular component or sensor, wireless devices affixed to or incorporated into various mobile platforms, and similar electronic devices that include a memory, wireless communication components and a programmable processor, or that is configured to communicate via a wireless or wired medium. A wireless device also may be referred to as an access terminal, a terminal, a mobile station, a wireless communication device, a handheld device, a subscriber unit, a station, etc.

False or misleading news items have become a major problem on the Internet with the proliferation of social media platforms. Unscrupulous users with may alter, modify, or even fabricate news items. These false or misleading news items may be posted for public consumption with little to none journalistic integrity. While the Internet enables the rapid dissemination of accurate news, without a reliable mechanism for determining whether a news item has been altered or reformatted, the Internet may easily be abused to spread false or misleading information. False or misleading news items may include outright falsehoods or fabricated news items. However, misleading news items may also include articles that have been edited or reformatted to change the context or meaning of the article. For example, articles may be placed with photos different from original photos accompanying the articles. As another example, articles may be reformatted to alter the meaning of the article (for example to create a different emphasis were different meaning in the text, or to change an editorial slant of an article). As another example, key information may be removed from an article which is otherwise unaltered. As another example, information may be added to an otherwise-unaltered article. Other examples are possible of editing, reformatting, or changing the context of an article to change the article's meaning. In many case, subtle changes to the color, tone or even speed at which a video, audio, or photo file is presented to the use may substantially alter the perceived meaning or context of the original file so as to support a particular bias or point of view.

To address these problems, various embodiments include methods that may be implemented on a processor of a network element and a processor of a computing device to enable verification of the integrity of a news item. In some embodiments, an organization such as a media outlet may maintain a publicly available digital ledger of news items released by the media outlet. The publicly available digital ledger may enable a computing device that obtains a news item release by the media outlet to verify the origin and/or integrity of the news item. In some embodiments, the computing device may determine whether the news item was modified subsequent to publication and release by the media outlet.

Various embodiments may include a method of enabling integrity verification of the news item by a processor of a computing device, such as a network element. In some embodiments, a processor of the network element (e.g., a server operated by a media outlet) may obtain an electronic news item that is ready for publication. The electronic news item may include one or more content components, such as text, images, multimedia, or other content. The processor may determine a fingerprint for one or more content components of the electronic news item. In some embodiments, the fingerprint may include a value based or calculated from one or more content components.

In some embodiments, in order to generate the one or more fingerprints, the processor may remove metadata from each content component. For example, the processor may remove metadata from one or more images, videos, audio recordings, or other media content ("media content items") included in the news item.

In some embodiments, one or more fingerprints may be generated separately for each content component (e.g., a separate fingerprint for text, for all images, groups of images or each image separately, for one or more multimedia components, and the like). In some embodiments, separately generated fingerprints may be used to generate an overall fingerprint for the news item.

In some embodiments, the processor may add one or more data tags to the news item that identify portions of the news item used to determine the fingerprint. For example, the processor may add metadata to the news item to identify the portions of the news item. As another example, the processor may embed metadata or data tags within information of the news item, such as information for one or more content components, to identify the portions of the news item used to determine the fingerprint. In some embodiments, the processor may embed the determined fingerprint in the electronic news item.

In some embodiments, the processor may determine a record for the electronic news item, in which the record includes the determined fingerprint and the second fingerprint of previous electronic news item. In some embodiments, the record may include a data structure in an appropriate format to include information for the determined fingerprint and the second fingerprint. In some embodiments, determining the record for the electronic news item may include incorporating the record into a publicly available digital ledger. In some embodiments, the processor may determine a record identifier that enables another device (e.g., computing device) to locate the record in the digital ledger. In some embodiments, the processor may embed or incorporate the determined record identifier in the electronic news item. The processor may subsequently publish (i.e., make public in some suitable manner) the electronic news item.

Various embodiments may include a method of integrity verification of a news item by a processor of a computing device. In some embodiments, the processor of the computing device may obtain a published electronic news item and extract an embedded fingerprint from the electronic news item.

In some embodiments, the processor may identify one or more content components of the electronic news item usable to calculate a fingerprint of the electronic news item. In some embodiments, the processor may determine one or more indications in the electronic news item, such as metadata, data tags, or the like, to identify the one or more content components to calculate the fingerprint of the electronic news item. The processor may calculate the fingerprint of the electronic news item using the identified content components.

In some embodiments, the processor may determine whether the embedded fingerprint and the calculated fingerprint match. In some embodiments, in response to determining that the embedded fingerprint on the calculated fingerprint match, the processor may determine whether the embedded fingerprint matches a fingerprint of the electronic news item stored in a publicly available digital ledger. In some embodiments, the processor may determine a record identifier enabling the location of the record in the digital ledger corresponding to the news item, and may obtain from the record in the digital ledger the fingerprint of the electronic news item.

In some embodiments, the processor of the computing device may consider one or more other records in the digital ledger to determine whether the news item is valid. For example, the processor may determine whether a previous record in the digital ledger is valid based on the fingerprint of the electronic news item and a fingerprint of the previous record. In response to determining that the previous record in the digital ledger is valid, the processor may determine that the integrity of the electronic news item is verified.

As another example, additionally or alternatively, the processor may determine a fingerprint of a subsequent record in the digital ledger. The processor may determine whether the subsequent record in the digital ledger is valid based on the fingerprint of the electronic news item and the determined fingerprint of the subsequent record. In response to determining that the subsequent record in the digital ledger is valid, the processor may determine that the integrity of the electronic news item is verified.

Various embodiments may be implemented within a variety of communication systems 100, an example of which is illustrated in FIG. 1. With reference to FIG. 1, the communication system 100 may include a network element 102, a computing device 104, a computing device 106, and a communication network 150. The communication network 150 may provide access to one or more wireless devices via an access point or base station 110, which may communicate with the communication network 150 over a wired or wireless communication link 124 which may include a communications backhaul to the communication network 150. The network element 102 may communicate with the communication network 150 over a wired or wireless communication link 120. The computing device 104 may communicate with the communication network 150 over a wired or wireless communication link 122. The computing device 106 may communicate with the base station 110 over a wireless communication link 126. The base station 110 may include base stations (e.g., 110) configured to provide wireless communications over a wide area (e.g., macro cells), as well as small cells, which may include a micro cell, a femto cell, a pico cell, and other similar network access points. The communication network 150 may include one or more network elements, such as servers and other similar devices (not illustrated).

The wireless and/or wired communication links 120, 122, 124, and 126 may include a plurality of carrier signals, frequencies, or frequency bands, each of which may include a plurality of logical channels. Each of the wireless communication links may utilize one or more radio access technologies (RATs). Examples of RATs that may be used in one or more of the various wireless communication links 120, 122, 124, and 126 include an Institute of Electrical and Electronics Engineers (IEEE) 802.15.4 protocol (such as Thread, ZigBee, and Z-Wave), any of the Institute of Electrical and Electronics Engineers (IEEE) 16.11 standards, or any of the IEEE 802.11 standards, the Bluetooth® standard, Bluetooth Low Energy (BLE), 6LoWPAN, LTE Machine-Type Communication (LTE MTC), Narrow Band LTE (NB-LTE), Cellular IoT (CIoT), Narrow Band IoT (NB-IoT), BT Smart, Wi-Fi, LTE-U, LTE-Direct, MuLTEfire, as well as relatively extended-range wide area physical layer interfaces (PHYs) such as Random Phase Multiple Access (RPMA), Ultra Narrow Band (UNB), Low Power Long Range (LoRa), Low Power Long Range Wide Area Network (LoRaWAN), and Weightless. Further examples of RATs that may be used in one or more of the various wireless communication links within the communication system 100 include 3GPP Long Term Evolution (LTE), 3G, 4G, 5G, Global System for Mobility (GSM), GSM/General Packet Radio Service (GPRS), Enhanced Data GSM Environment (EDGE), Code Division Multiple Access (CDMA), frequency division multiple access (FDMA), time division multiple access (TDMA), Wideband Code Division Multiple Access (W-CDMA), Worldwide Interoperability for Microwave Access (WiMAX), Time Division Multiple Access (TDMA), and other mobile telephony communication technologies cellular RATs, Terrestrial Trunked Radio (TETRA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, and other mobile telephony communication technologies cellular RATs or other signals that are used to communicate within a wireless, cellular or Internet of Things (IoT) network or further implementations thereof. Wired communication protocols may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP), or another suitable wired communication protocol.

Figure 2:
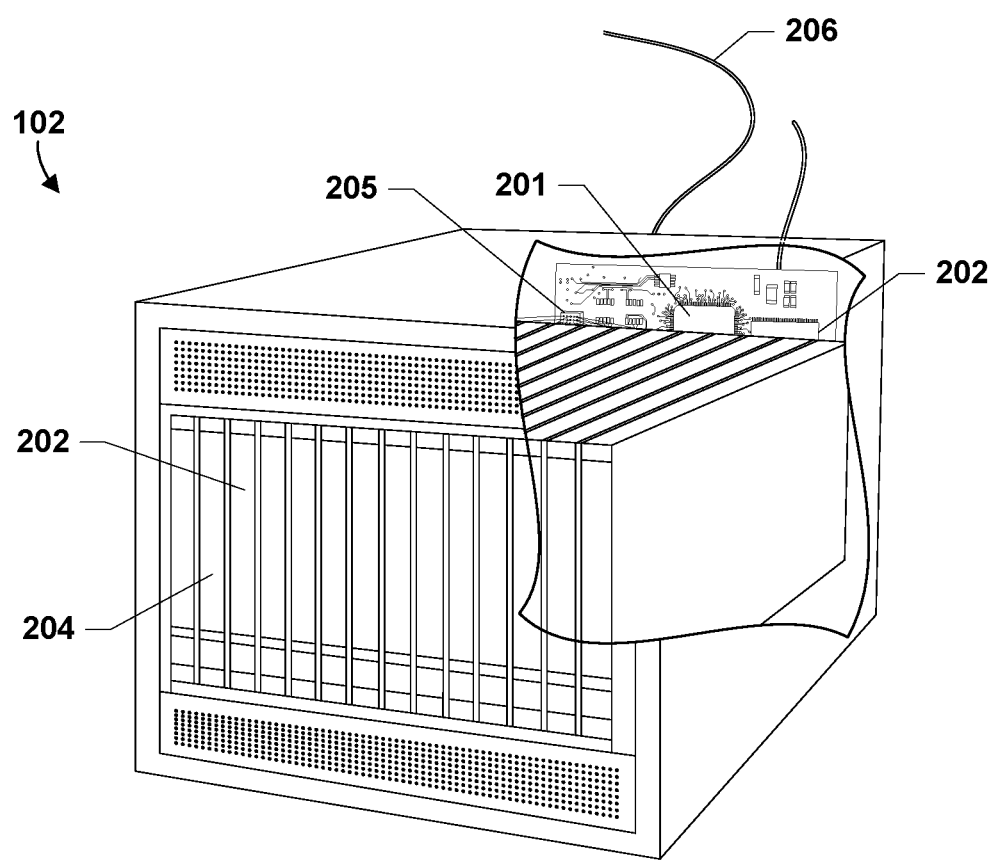
FIG. 2 is a component block diagram illustrating components of a network element suitable for implementing various embodiments.

Various embodiments may employ a computing device as a network element of a communication network. Such network elements may typically include at least the components illustrated in FIG. 2, which illustrates an example network element 102. With reference to FIGS. 1 and 2, the network element 102 may include a processor 201 coupled to volatile memory 202 and a large capacity nonvolatile memory, such as a disk drive 203. The network element 102 may also include a peripheral memory access device such as a floppy disc drive, compact disc (CD) or digital video disc (DVD) drive 206 coupled to the processor 201. The network element 102 may also include network access ports 204 (or interfaces) coupled to the processor 201 for establishing data connections with a network, such as the Internet and/or a local area network coupled to other system computers and servers. Similarly, the network element 102 may include additional access ports, such as USB, Firewire, Thunderbolt, and the like for coupling to peripherals, external memory, or other devices.

Figure 3:
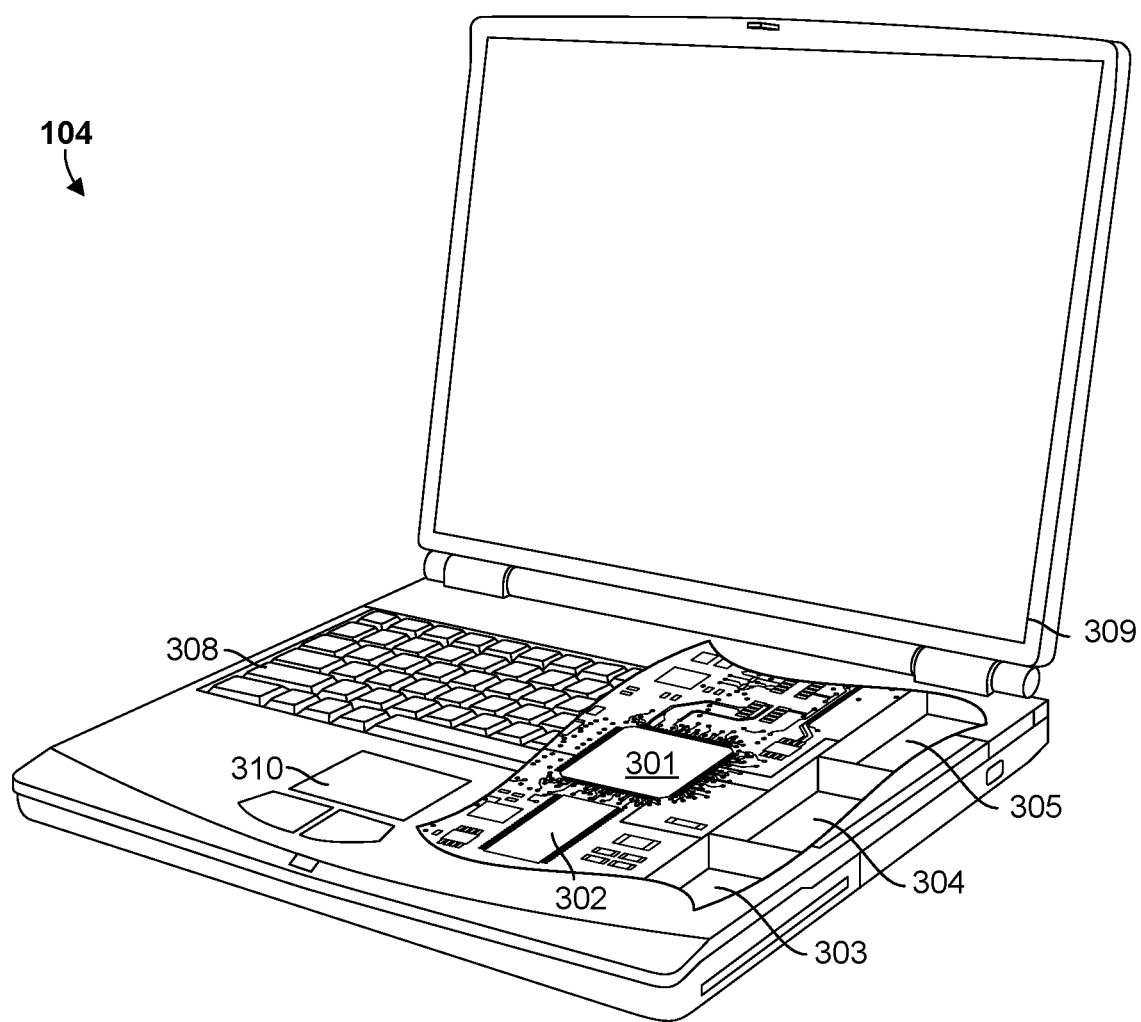
FIG. 3 is a component block diagram illustrating components of a portable computing device suitable for implementing various embodiments.
Figure 4:
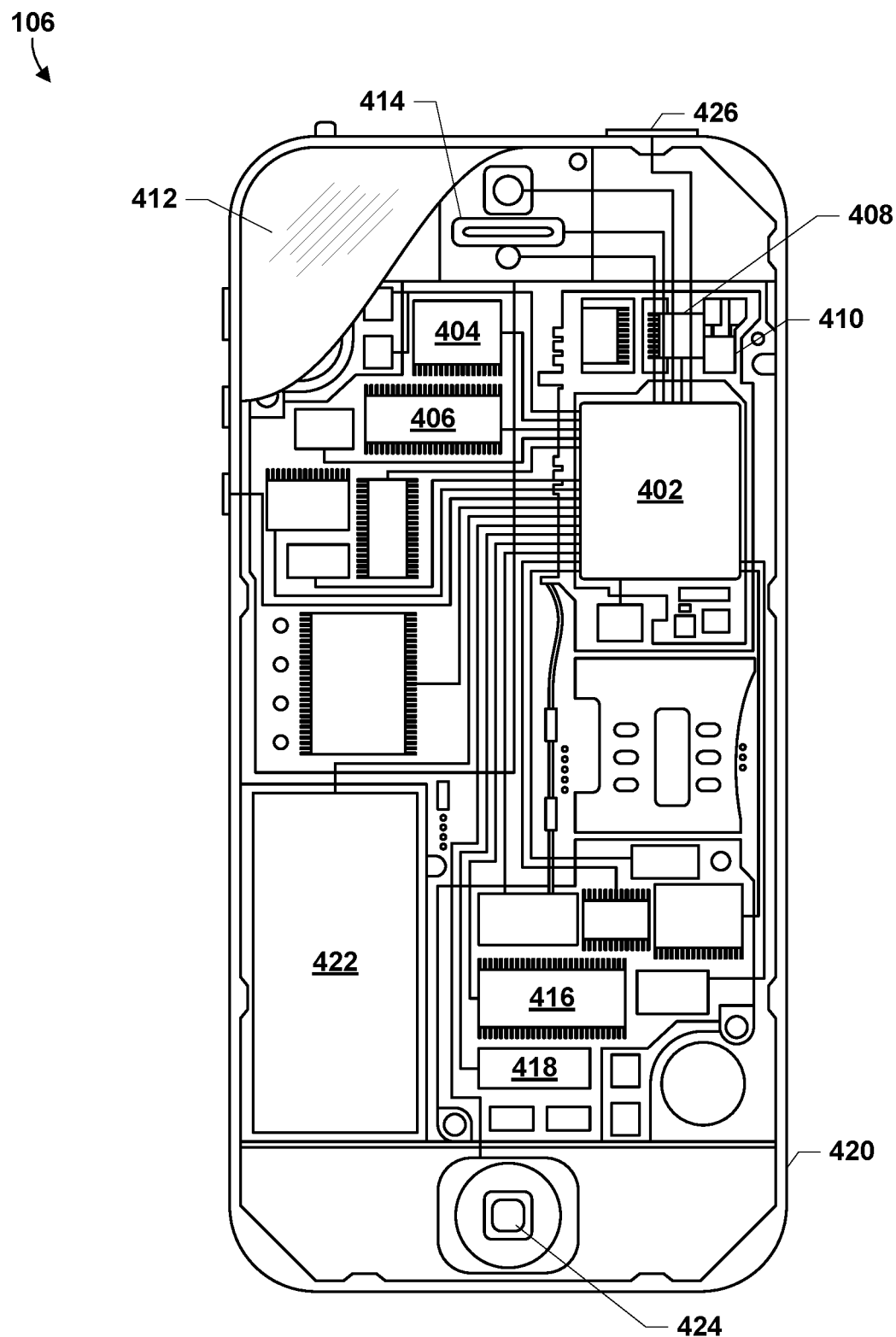
FIG. 4 is a component block diagram illustrating components of a portable computing device suitable for implementing various embodiments.

Various embodiments may be implemented in any of a variety of computing devices, examples of which (e.g., a portable computing device 104 and a mobile computing device 106) are illustrated in FIGS. 3 and 4.

With reference to FIG. 3, the portable computing device 104 may include a processor 301 coupled to volatile memory 302 and a large capacity nonvolatile memory, such as a disk drive 303. The portable computing device 104 may also include a compact disc (CD) and/or DVD drive 304 coupled to the processor 301. The portable computing device 104 may also include a number of connector ports coupled to the processor 301 for establishing data connections or receiving external memory devices, such as a network connection circuit 305 for coupling the processor 301 to a network. The portable computing device 104 may further be coupled to a keyboard 308, a pointing device such as a mouse 310, and a display 309 as is well known in the computer arts.

With reference to FIG. 4, the mobile computing device 106 may include a processor 402 coupled to a touchscreen controller 404 and an internal memory 406. The processor 402 may be one or more multi-core integrated circuits designated for general or specific processing tasks. The internal memory 406 may be volatile or non-volatile memory, and may also be secure and/or encrypted memory, or unsecure and/or unencrypted memory, or any combination thereof. The touchscreen controller 404 and the processor 402 may also be coupled to a touchscreen panel 412, such as a resistive-sensing touchscreen, capacitive-sensing touchscreen, infrared sensing touchscreen, etc. Additionally, the display of the mobile computing device 106 need not have touch screen capability.

The mobile computing device 106 may have two or more radio signal transceivers 408 (e.g., Peanut, Bluetooth, Zigbee, Wi-Fi, RF radio) and antennae 410, for sending and receiving communications, coupled to each other and/or to the processor 402. The transceivers 408 and antennae 410 may be used with the above-mentioned circuitry to implement the various wireless transmission protocol stacks and interfaces. The portable computing device 104 may include one or more cellular network wireless modem chip(s) 416 coupled to the processor and antennae 410 that enables communication via two or more cellular networks via two or more radio access technologies. The portable computing device 104 may include a peripheral device connection interface 418 coupled to the processor 402. The peripheral device connection interface 418 may be singularly configured to accept one type of connection, or may be configured to accept various types of physical and communication connections, common or proprietary, such as USB, FireWire, Thunderbolt, or PCIe. The peripheral device connection interface 418 may also be coupled to a similarly configured peripheral device connection port (not shown). The mobile computing device 106 may also include speakers 414 for providing audio outputs. The mobile computing device 106 may also include a housing 420, constructed of a plastic, metal, or a combination of materials, for containing all or some of the components discussed herein. The mobile computing device 106 may include a power source 422 coupled to the processor 402, such as a disposable or rechargeable battery. The rechargeable battery may also be coupled to the peripheral device connection port to receive a charging current from a source external to the mobile computing device 106. The mobile computing device 106 may also include a physical button 424 for receiving user inputs. The mobile communication device 106 may also include a power button 426 for turning the portable computing device 104 on and off The processors 201, 301 and 402 may be any programmable microprocessor, microcomputer or multiple processor chip or chips that can be configured by software instructions (applications) to perform a variety of functions, including the functions of various embodiments described below. In some mobile devices, multiple processors 301 and 402 may be provided, such as one processor dedicated to wireless communication functions and one processor dedicated to running other applications. Typically, software applications may be stored in the internal memories 302 and 406 before they are accessed and loaded into the processor 301 and 402. The processor 301 and 402 may include internal memory sufficient to store the application software instructions.

Figure 5A:
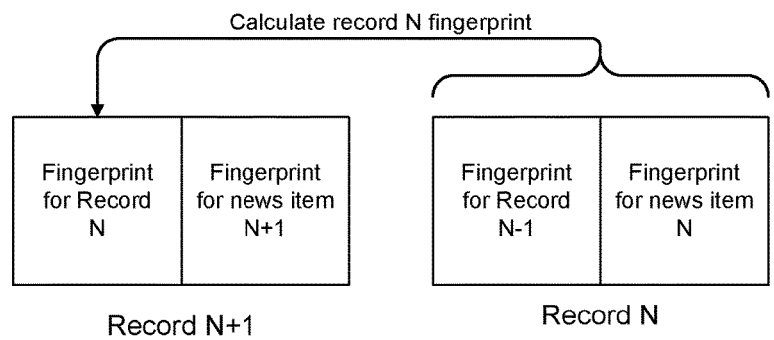
FIGS. 5A and 5B are a block diagrams illustrating records in a publicly available digital ledger suitable for implementing various embodiments.
Figure 5B:
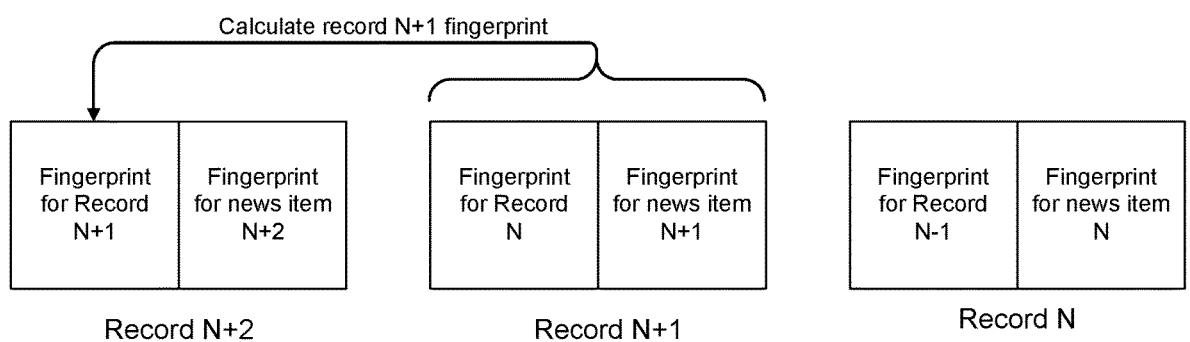

FIGS. 5A and 5B are block diagrams illustrating records in a publicly available digital ledger suitable for implementing various embodiments. With reference to FIGS. 1-5B, in some embodiments, the digital ledger may include a plurality of chained records, each associated with the news item, in which a change in a single data record may affect the subsequent chain of data records. Each record may be associated with one news item. Each record may also be associated with a record locator enabling the location of a record in the digital ledger.

In various embodiments, a record (e.g., Record N, Record N+1, and Record N+2) may be determined sequentially. For example, the processor may create Record N, then Record N+1, then Record N+2, and so forth. Thus, Record N is previous to Record N+1, and Record N+2 is subsequent to Record N+1.

Each record may include two data components. The first component may be a fingerprint for an associated news item. The second component may be a fingerprint for a previous record. For example, Record N+1 includes a fingerprint for associated news item N+1, and a fingerprint for the previous record, Record N. Similarly, Record N+2 includes a fingerprint for associated news item N+2 and a fingerprint for the previous record, Record N+1. In some embodiments, the fingerprint for each news item and the fingerprint for each previous record may be determined by a processor device (e.g., a processor of the network element 102, the computing device 104, the computing device 106, etc.) in the form of a hash value. In some embodiments, the fingerprint for a news item may be calculated just prior to the publication of the news item. By determining the Record N+1 based on the fingerprint for Record N, a one-way association may be created between the Record N+1 and the preceding Record N. Once published in the digital ledger, no record may be altered without changing records for all following records, which facilitates the detection of a record that has been altered.

In some embodiments, the first record in the digital ledger (e.g., Record N) may not be determined based on a previous record, but may be derived in a variety of ways. For example, the processor may calculate a hash of the associated news item N using a public key (e.g., a public key of the media outlet). As another example, the processor may calculate a hash using time and/or date when the news item N was published. As another example, the processor may calculate a hash using a random sequence of characters. In some embodiments, the fingerprint for the first record may also serve as a unique identifier for the digital ledger.

In some embodiments, the size of a fingerprint (e.g., the size of a hash) in each record may be different. In some embodiments, to facilitate implementation and data handling, each fingerprint may be associated with information indicating a fingerprint type (e.g., a hash type) and a fingerprint size. In some embodiments, the fingerprint size and fingerprint type information may be maintained in the digital ledger but may not be used to calculate a fingerprint for a next or subsequent record in the digital ledger. Such embodiments may provide flexibility to allow modification and/or updating of a size and/or type of fingerprint over time without requiring modification of the structure of the digital ledger or invalidating the history or records of the digital ledger.

Figure 6:
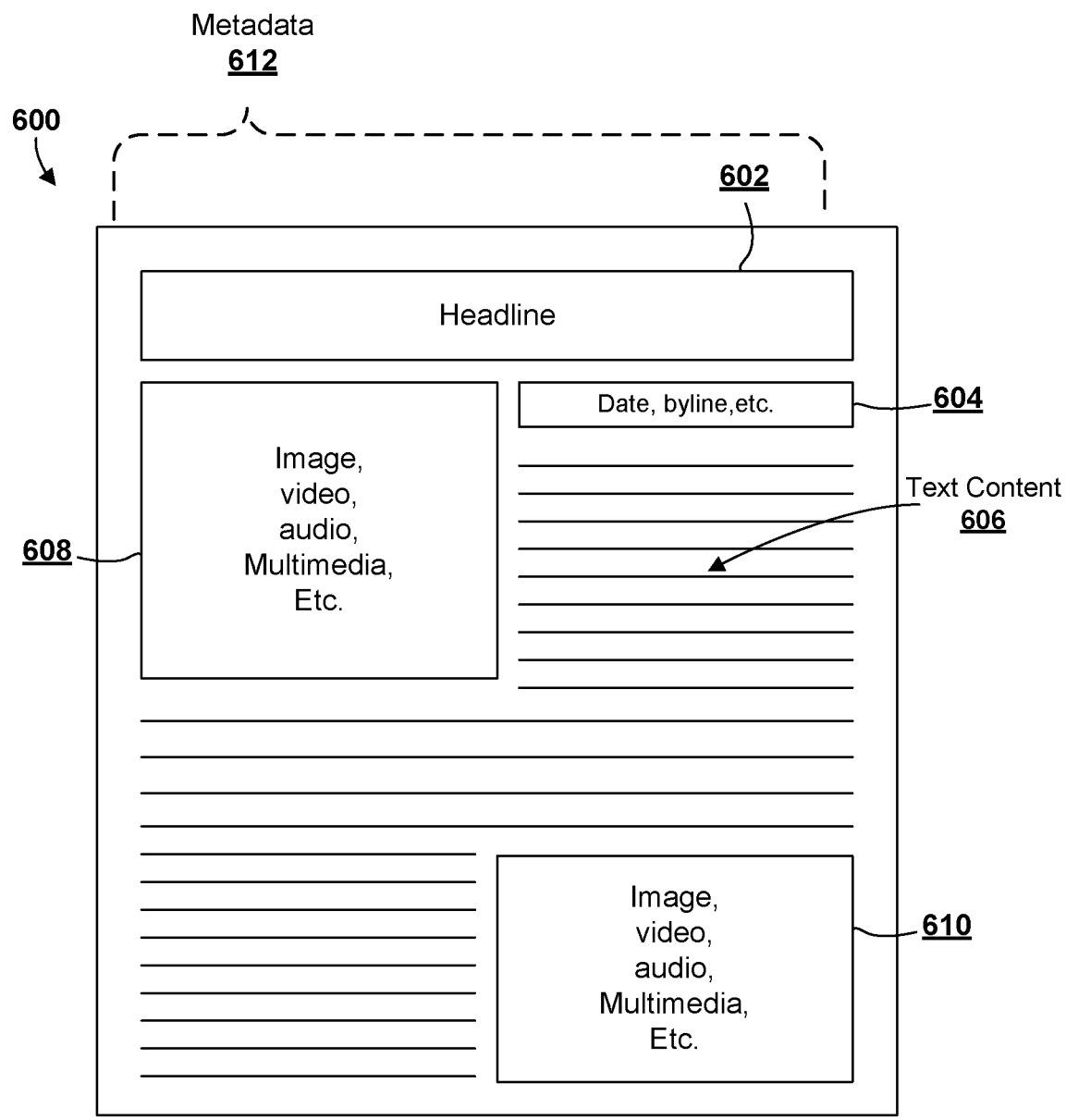
FIG. 6 is a block diagram illustrating an example news item suitable for implementing various embodiments.

FIG. 6 is a block diagram illustrating an example news item suitable for implementing various embodiments. With reference to FIGS. 1-6, in various embodiments, a processor (e.g., 201, 301, 402) may calculate a fingerprint of the news item based on one or more content components of the news item. A news item 600 may include a headline 602, byline information 604 such as a date, an author of the news item, and other similar information, text content 606, and image information 608 and 610, such as an image, video, audio, multimedia, or other suitable media content item information. The news item 600 may also include metadata 612, which may include information present in the news item 600 that is not presented to a user. For example, metadata 612 may include information used by a processor to render, display, or present one or more of the content components 602-610, such as markup language code (e.g., HTML). Metadata 612 may also include a variety of other information that is not presented to the user but is included in the information making up the news item 600.

A processor device (e.g., a processor of the network element 102, the computing device 104, the computing device 106, etc.) may calculate a fingerprint for the news item 600 based on one or more content components 602-610 and/or the metadata 612. In some embodiments, the processor may determine the fingerprint based on all of the content components 602-610 and the metadata 612 to incorporate not only content information but also, for example, a layout or a structure of the news item 600, a placement of various content components such as a location in the news item 600 of the headline 602, image information 608 and 610, and other aspects of the news item 600.

In some embodiments, the processor may embed the calculated fingerprint in the news item 600. In some embodiments, the processor may embed in the news item 600, or associate with the news item 600, a unique identifier for the digital ledger in the news item 600. In some embodiments, the processor may associate or embed the image information 608 and 610 in the news item 600, and the processor may calculate the fingerprint based on the embedded image information 608 and 610 (e.g., in addition to other information that may be used to calculate the fingerprint). In some embodiments, the processor may embed the calculated fingerprint and/or the unique identifier for the digital ledger in the image information 608, 610. For example, the processor may embed such information in an alpha channel of an image or video, as an add-on sequence at the end of a video, or another suitable association.

In some embodiments, in the case of a news item including text and formatting, the processor may calculate the fingerprint using one or more of metadata 612 (e.g., embedded formatting tags) and text information (e.g., text content 606) to represent the entire news item 600.

In some embodiments, in the case of a news item including one or more images, the processor may calculate the fingerprint using one or more of metadata 612 (e.g., formatting information), including all formatting tags, as well as any linked or embedded images (e.g., 608, 610). In some embodiments, prior to determining the fingerprint, the processor may remove from the news item 600 any metadata (e.g., metatags) associated with images referenced in the news item 610. In some embodiments, after determining the fingerprint, the processor may embed within the news item 600 the image information 608, 610. In some embodiments, after determining the fingerprint, the processor may embed within the news item 600 the image information 608, 610. In some embodiments, after determining the fingerprint, the processor may embed within the news item 600 the unique identifier of the digital ledger and/or the determined fingerprint.

In some embodiments in which the news item includes multimedia information (e.g., video, audio, or a multimedia presentation), the processor may calculate the fingerprint using one or more of metadata information 612 (e.g., embedded formatting tags and any other metadata) as well as any linked or embedded multimedia content (e.g., 608, 610). In some embodiments, prior to determining the fingerprint, the processor may remove any metadata associated with the multimedia information (e.g., metatags). In some embodiments, after calculating the fingerprint for the news item 600, the processor may embed the multimedia information in the news item 600. In some embodiments, after determining the fingerprint, the processor may embed within the news item 600 the unique identifier of the digital ledger and/or the determined fingerprint.

In some embodiments, the processor may add to the news item 600 one or more data tags that identify portions of the news item used to determine the fingerprint. For example, the processor may add to the news item 600 one or more data tags identifying the content components 602-610 and or the metadata 612 used by the processor to determine the fingerprint. In some embodiments, the processor may add markup language tags before a content component (e.g., <finger>) and after a content component (e.g., /<finger>) to indicate a start point and end point of a content component used by the processor to determine the fingerprint. In some embodiments, the processor may add to the news item 600 one or more data tags identifying the unique identifier of the digital ledger (e.g., <digital ledger ID> to identify the beginning of the digital ledger identifier, and /<digital ledger ID> to identify the end of the digital ledger identifier).

Figure 7:
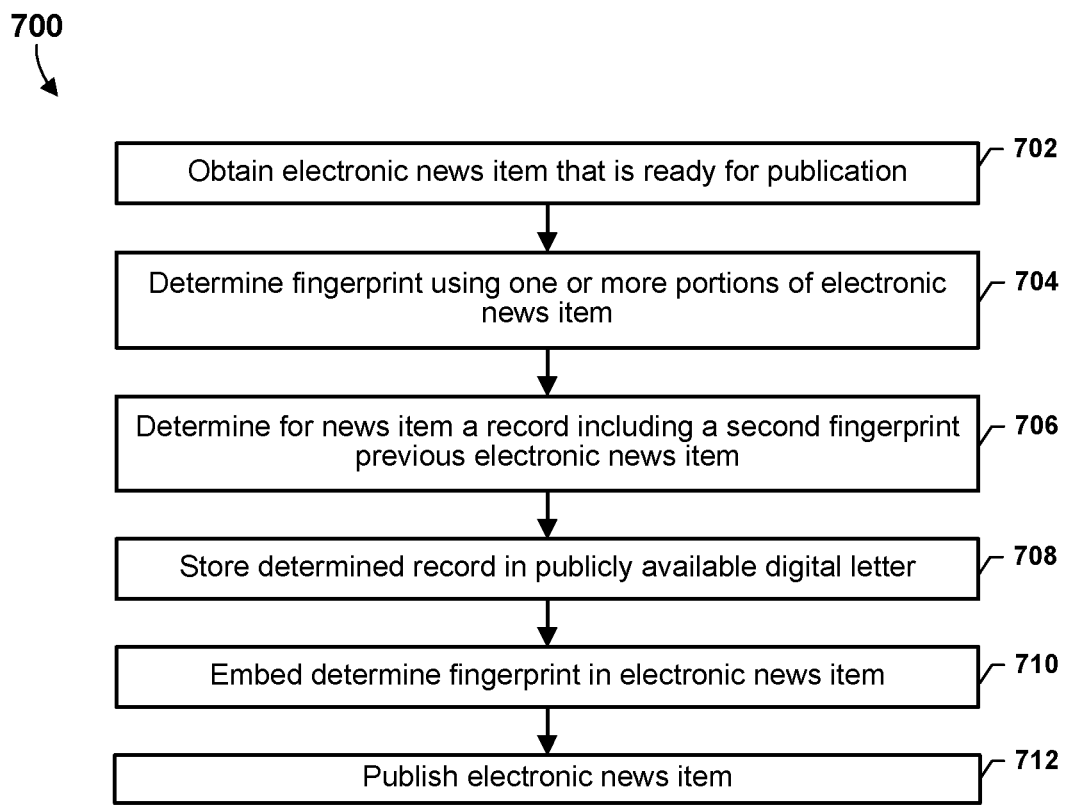
FIG. 7 is a process flow diagram illustrating a method of enabling integrity verification of a news item by a processor of a computing device according to various embodiments.

FIG. 7 is a process flow diagram illustrating a method of enabling integrity verification of a news item by a processor of a computing device according to various embodiments. With reference to FIGS. 1-7, the method 700 may be implemented in hardware components and/or software components of a network element (e.g., the network element 102), the operation of which may be controlled by one or more processors (e.g., the processor 201 and/or the like) of the network element.

In block 702, the processor may obtain an electronic news item that is ready for publication. In some embodiments, the electronic news item may be in its final form for publication, including formatting and/or layout information, associated images or multimedia information, and/or the like.

In block 704, the processor may determine a fingerprint using one or more portions of the electronic news item. For example, the processor may determine the fingerprint using one or more content components 602-610 and/or metadata 612 (FIG. 6).

In block 706, the processor may determine for the electronic news item a record including the determined fingerprint and a second fingerprint of a previous electronic news item. For example, the processor may determine a record (e.g., the Record N+1) that includes the fingerprint determined for the electronic news item and a second fingerprint of a previous electronic news item (e.g., the fingerprint for the Record N).

In block 708, the processor may store the determined record in publicly available digital ledger.

In block 710, the processor may embed the determined fingerprint in the electronic news item.

In block 712, the processor may publish the electronic news item.

Figure 8:
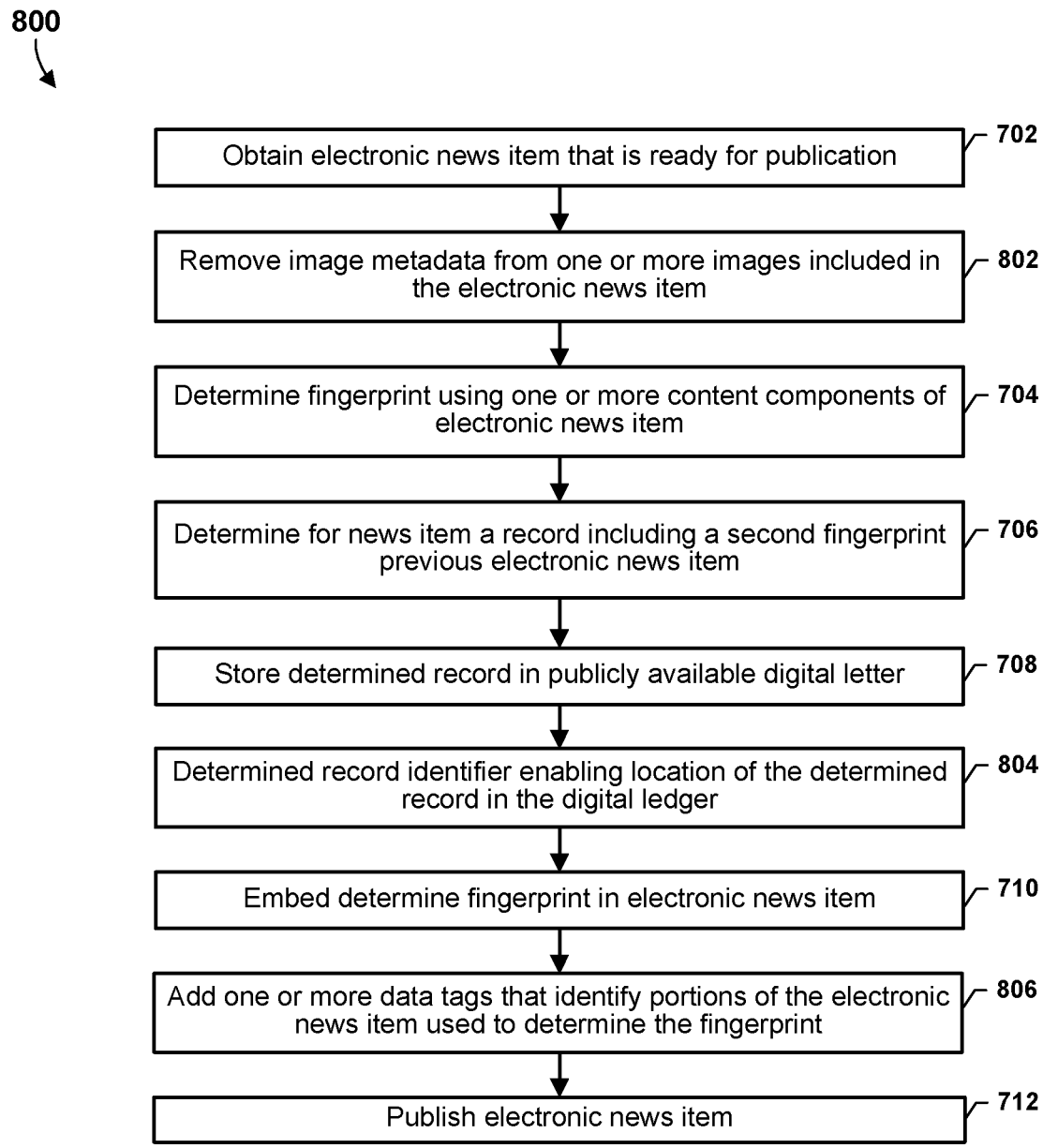
FIG. 8 is a process flow diagram illustrating a method of enabling integrity verification of a news item by a processor of a computing device according to various embodiments.

FIG. 8 is a process flow diagram illustrating a method of enabling integrity verification of a news item by a processor of a computing device according to various embodiments. With reference to FIGS. 1-8, the method 800 may be implemented in hardware components and/or software components of a network element (e.g., the network element 102), the operation of which may be controlled by one or more processors (e.g., the processor 201 and/or the like) of the network element. In blocks 702-712, the processor of the computing device may perform operations of like-numbered blocks of the method 700 as described.

In block 802, the processor may remove metadata from one or more media content items included in the electronic news item. The processor may proceed to determine the fingerprint using one or more content components of the electronic news item in block 704.

In block 804, the processor may determine a record identifier enabling the location of the determined record in the digital ledger. For example, the record identifier may be used by another computing device to locate the record in the digital ledger.

In block 806, the processor may add to the electronic news item one or more data tags that identify portions of the electronic news item used to determine the fingerprint. The portions may include one or more content components (e.g., the content components 602-610) and/or metadata (e.g., the metadata 612).

Figure 9:
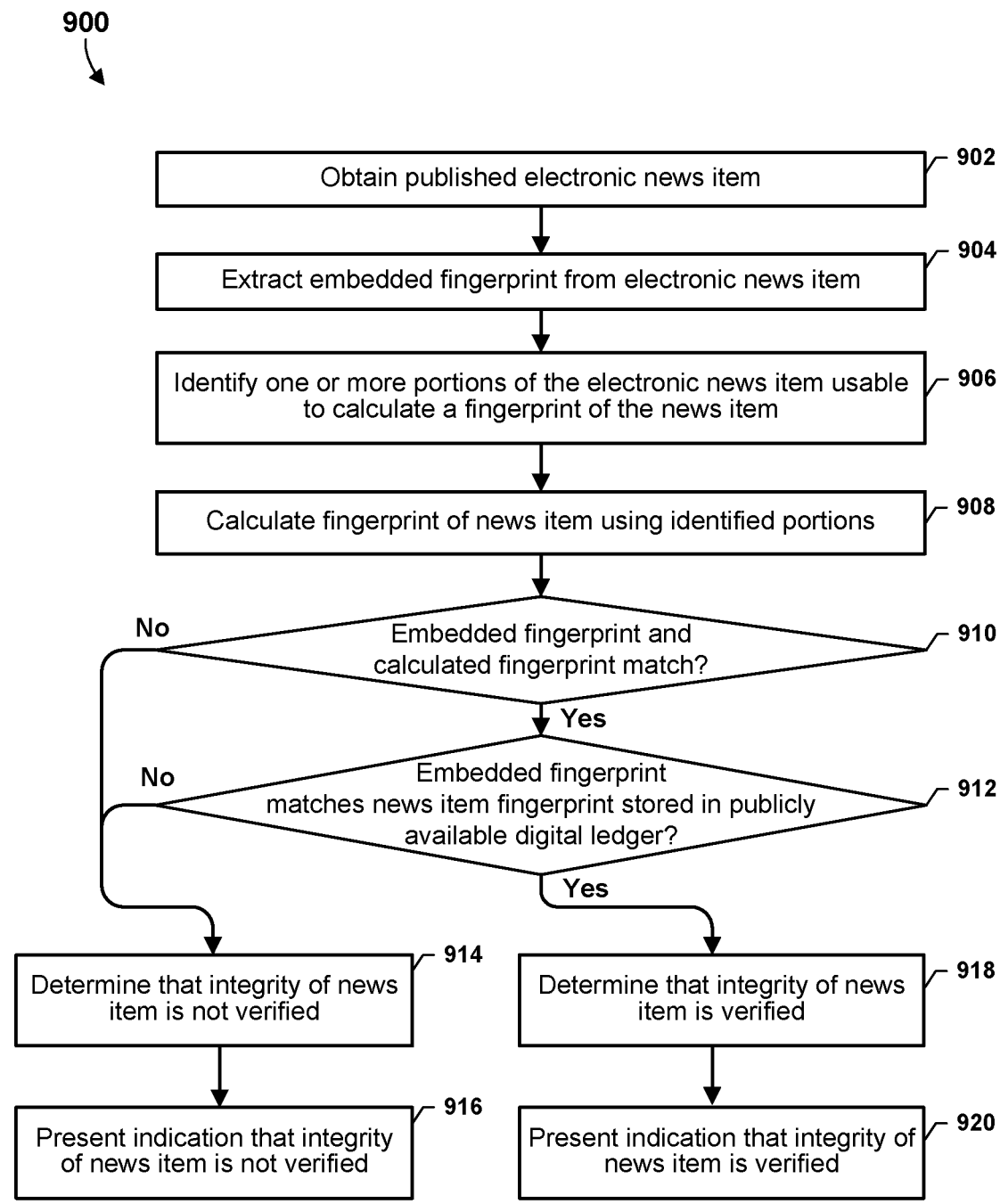
FIG. 9 is a process flow diagram illustrating a method of integrity verification of a news item by a processor of a computing device according to various embodiments.

FIG. 9 is a process flow diagram illustrating a method of integrity verification of a news item by a processor of a computing device according to various embodiments. With reference to FIGS. 1-9, the method 900 may be implemented in hardware components and/or software components of a computing device (e.g., the computing devices 104 and 106), the operation of which may be controlled by one or more processors (e.g., the processor 301, 402, and/or the like) of the computing device.

In block 902, the processor may obtain a published electronic news item. For example, the processor may obtain information of a published electronic news item by accessing a URI, opening an attachment of a message, or the like.

In block 904, the processor may extract and embedded fingerprint from the electronic news item.

In block 906, the processor may identify one or more portions of the electronic news item usable to calculate a fingerprint of the electronic news item. For example, the processor may identify one or more data tags in the electronic news item that identify, for example, a content component or metadata that the processor may use to calculate the fingerprint of the electronic news item.

In block 908, the processor may calculate the fingerprint of the news item using the identified portions In determination block 910, the processor may determine whether the embedded fingerprint and the calculated fingerprint match.

In response to determining that the embedded fingerprint and the calculated fingerprint do not match (i.e., determination block 910="No"). the processor may determine that the integrity of the news item is not verified in block 914.

In block 916, the processor may present an indication that the integrity of the news item is not verified. For example, the processor may output a visual, audible, tactile, or another output perceivable by a user to indicate that the news item's integrity is not verified, and may be a misleading or false news item.

In response to determining that the embedded fingerprint and the calculated fingerprint matches (i.e., determination block 910="Yes"), the processor may determine whether the embedded fingerprint matches a news item fingerprint that is stored in a publicly available digital ledger in determination block 912.

In response to determining that the embedded fingerprint does not match the news item fingerprint stored in the publicly available digital ledger (i.e., determination block 912="No"), the processor may determine that the integrity of the news item is not verified in block 914. In block 916, the processor may present an indication that the integrity of the news item is not verified.

In response to determining that the embedded fingerprint matches the news item fingerprint stored in the publicly available digital ledger (i.e., determination block 912="Yes"), the processor may determine that the integrity of the news item is verified in block 918.

In block 920, the processor may present an indication that the integrity of the news item is verified. The presented indication may include, for example, visual, audible, tactile, or another output perceivable by a user. As but one example, a display device of the computing device may display a first symbol (e.g., a green lock symbol in an Internet browser) to indicate that the news item's integrity has been verified, and a second symbol (e.g., a red lock symbol in the Internet browser) to indicate that the news item's integrity has not been verified.

Figure 10:
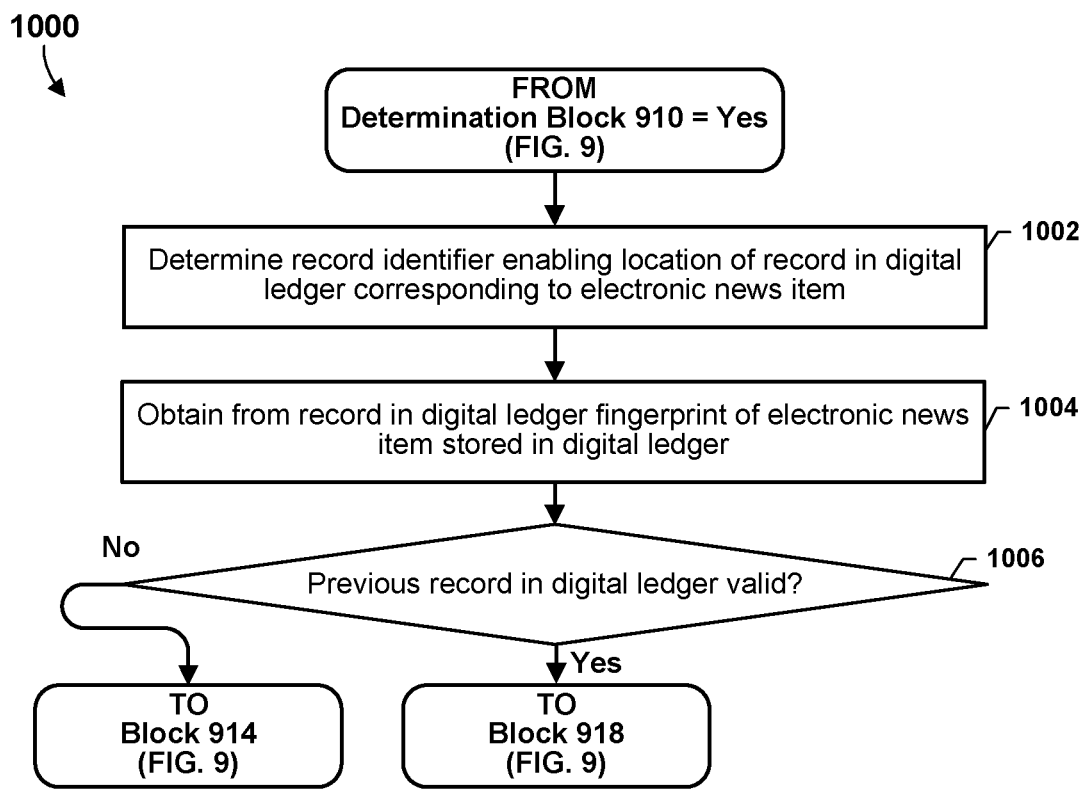
FIG. 10 is a process flow diagram illustrating operations that may be performed as part of a method of integrity verification of a news item by a processor of a computing device according to various embodiments.

FIG. 10 is a process flow diagram illustrating operations that may be performed as part of a method of integrity verification of a news item by a processor of a computing device according to various embodiments. With reference to FIGS. 1-10, the method 1000 may be implemented in hardware components and/or software components of a computing device (e.g., the computing devices 104 and 106), the operation of which may be controlled by one or more processors (e.g., the processor 301, 402, and/or the like) of the computing device.

In response to determining that the embedded fingerprint and the calculated fingerprint matches (i.e., determination block 910="Yes"), the processor may determine a record identifier enabling the location of a record in the digital ledger corresponding to the electronic news item in block 1002.

In block 1004, the processor may obtain from the record in the digital ledger the fingerprint of the electronic news item stored in the digital ledger.

In determination block 1006, the processor may determine whether a previous record in the digital ledger is valid. In some embodiments, the processor may determine whether the previous record in the digital ledger is valid based on the fingerprint of the electronic news item and a fingerprint of the previous record.

For example, the processor may determine a record identifier associated with Record N+1 (FIG. 5A). The processor may obtain from the record the fingerprint associated with the news item N+1. The processor may also determine whether the previous record (e.g., Record N) is valid based on the fingerprint of the electronic news item N+1 and a fingerprint of the previous record (i.e., of Record N).

In response to determining that the previous record in the digital ledger is not valid (i.e., determination block 1006="No"), the processor may perform the operations of block 914 (FIG. 9).

In response to determining that the previous record in the digital ledger is valid (i.e., determination block 1006="Yes"), the processor may perform the operations of block 918 (FIG. 9).

Figure 11:
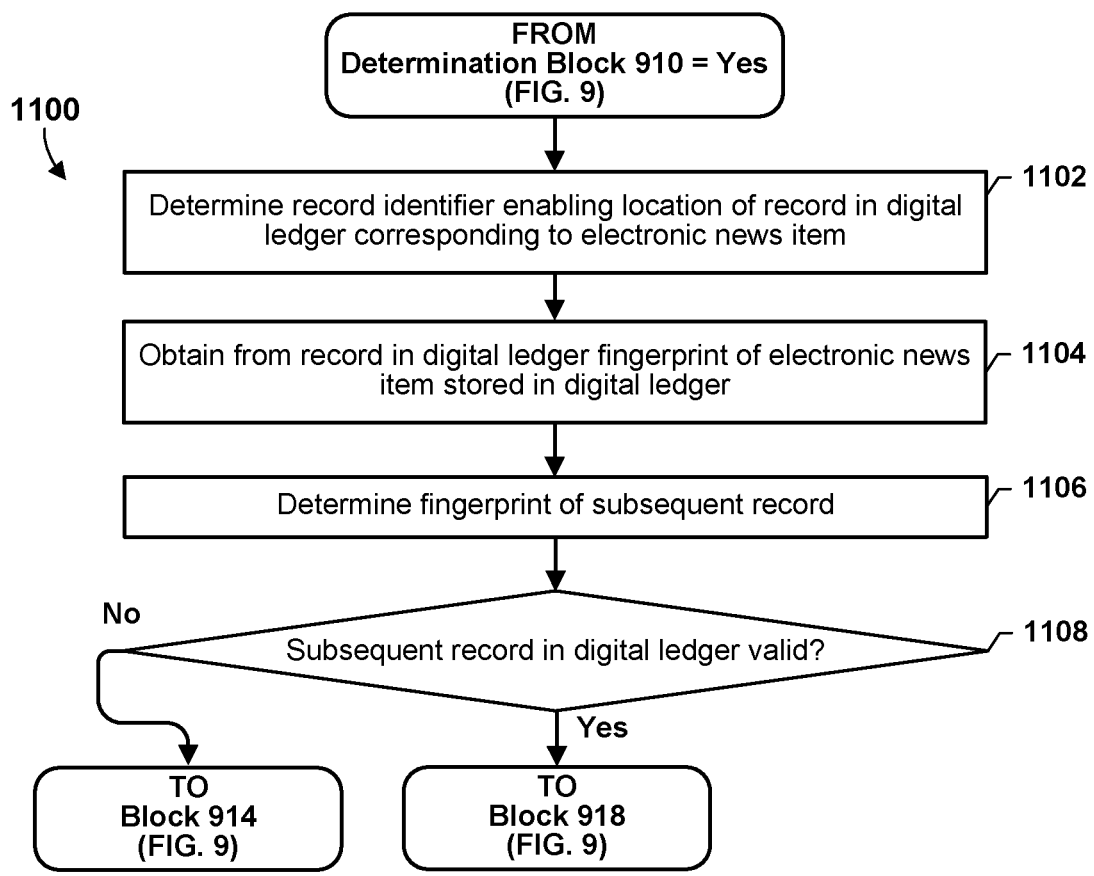
FIG. 11 is a process flow diagram illustrating operations that may be performed as part of a method of integrity verification of a news item by a processor of a computing device according to various embodiments.

FIG. 11 is a process flow diagram illustrating operations that may be performed as part of a method of integrity verification of a news item by a processor of a computing device according to various embodiments. With reference to FIGS. 1-11, the method 1100 may be implemented in hardware components and/or software components of a computing device (e.g., the computing devices 104 and 106), the operation of which may be controlled by one or more processors (e.g., the processor 301, 402, and/or the like) of the computing device.

In response to determining that the embedded fingerprint and the calculated fingerprint matches (i.e., determination block 910="Yes"), the processor may determine a record identifier enabling the location of a record in the digital ledger corresponding to the electronic news item in block 1102.

In block 1104, the processor may obtain from the record in the digital ledger the fingerprint of the electronic news item stored in the digital ledger.

In block 1106, the processor may determine a fingerprint of the subsequent record. In some embodiments, the processor may determine the fingerprint of the subsequent record based on the fingerprint of the electronic news item and the determined fingerprint of the subsequent record. For example, the processor may determine a record identifier associated with Record N+1 (FIG. 5B). The processor may obtain from the record the fingerprint associated with the news item N+1. The processor may also determine whether the subsequent record (e.g., Record N+2) is valid by calculating a fingerprint of Record N+2 based on the fingerprint of the electronic news item N+1 and a fingerprint of Record N.

In determination block 1108, the processor may determine whether the subsequent record in the digital ledger is valid. In some embodiments, the processor may determine whether the previous record in the digital ledger is valid based on the fingerprint of the electronic news item and a fingerprint of the subsequent record.

In response to determining that the subsequent record in the digital ledger is not valid (i.e., determination block 1108="No"), the processor may perform the operations of block 914 (FIG. 9).

In response to determining that the subsequent record in the digital ledger is valid (i.e., determination block 1108="Yes"), the processor may perform the operations of block 918 (FIG. 9).

In various embodiments, the processor may perform the operations of one of or both methods 1000 and 1100.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 700, 800, 900, 1000, and 1100 may be substituted for or combined with one or more operations of the methods 700, 800, 900, 1000, and 1100, and vice versa.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method of enabling integrity verification of a news item by a processor of a computing device, comprising:
   obtaining an electronic news item that is ready for publication;
   determining a fingerprint using one or more portions of the electronic news item;
   determining for the electronic news item a record including the determined fingerprint and a second fingerprint of a previous electronic news item;
   storing the determined record in a publicly available digital ledger;
   embedding the determined fingerprint in the electronic news item; and
   publishing the electronic news item.

2. The method of claim 1, further comprising:
   adding to the news item one or more data tags that identify portions of the electronic news item used to determine the fingerprint.

3. The method of claim 1, further comprising:
   removing metadata from one or more media content items included in the electronic news item.

4. The method of claim 1, wherein embedding the determined fingerprint in the electronic news item comprises embedding the determined fingerprint in a text portion of the electronic news item.

5. The method of claim 1, wherein embedding the determined fingerprint in the electronic news item comprises embedding the determined fingerprint in a media content item of the electronic news item.

6. The method of claim 1, further comprising:
   determining a record identifier enabling location of the determined record in the digital ledger; and
   embedding the determined record identifier in the electronic news item.

7. The method of claim 1, wherein the determined fingerprint is a hash value.

8. A method of integrity verification of a news item by a processor of a computing device, comprising:
   obtaining a published electronic news item;
   extracting an embedded fingerprint from the electronic news item;
   identifying one or more portions of the electronic news item usable to calculate a fingerprint of the electronic news item;
   calculating a fingerprint of the electronic news item using the identified one or more portions;
   determining whether the embedded fingerprint and the calculated fingerprint match;
   determining whether the embedded fingerprint matches a fingerprint of the electronic news item stored in a publicly available digital ledger in response to determining that the embedded fingerprint and the calculated fingerprint match; and
   determining that integrity of the news item is verified in response to determining that the embedded fingerprint matches the fingerprint of the electronic news item stored in the digital ledger.

9. The method of claim 8, wherein determining whether the embedded fingerprint matches the fingerprint of the electronic news item stored in a publicly available digital ledger comprises:
   determining a record identifier enabling location of a record in the digital ledger corresponding to the electronic news item; and
   obtaining from the record in the digital ledger the fingerprint of the electronic news item stored in the digital ledger.

10. The method of claim 9, further comprising:
    determining whether a previous record in the digital ledger is valid based on the fingerprint of the electronic news item and a fingerprint of the previous record; and
    determining that the integrity of the electronic news item is verified in response to determining that the previous record in the digital ledger is valid.

11. The method of claim 9, further comprising:
    determining a fingerprint of a subsequent record in the digital ledger;
    determining whether the subsequent record in the digital ledger is valid based on the fingerprint of the electronic news item and the determined fingerprint of the subsequent record; and
    determining that the integrity of the electronic news item is verified in response to determining that the subsequent record in the digital ledger is valid.

12. The method of claim 9, wherein the embedded fingerprint, calculated fingerprint, and the fingerprint of the electronic news item stored in the digital ledger are hash values.

13. A computing device, comprising:
   a memory; and
   a processor coupled to the memory and configured with processor-executable instructions to perform operations comprising:
      obtaining an electronic news item that is ready for publication;
      determining a fingerprint using one or more portions of the electronic news item;
      determining for the electronic news item a record including the determined fingerprint and a second fingerprint of a previous electronic news item;
      storing the determined record in a publicly available digital ledger;
      embedding the determined fingerprint in the electronic news item; and
      publishing the electronic news item.

14. The computing device of claim 13, wherein the processor is configured with processor-executable instructions to perform operations further comprising:
   adding to the news item one or more data tags that identify portions of the electronic news item used to determine the fingerprint.

15. The computing device of claim 13, wherein the processor is configured with processor-executable instructions to perform operations further comprising:
   removing metadata from one or more media content items included in the electronic news item.

16. The computing device of claim 13, wherein the processor is configured with processor-executable instructions to perform operations such that embedding the determined fingerprint in the electronic news item comprises embedding the determined fingerprint in a text portion of the electronic news item.

17. The computing device of claim 13, wherein the processor is configured with processor-executable instructions to perform operations such that embedding the determined fingerprint in the electronic news item comprises embedding the determined fingerprint in a media content item of the electronic news item.

18. The computing device of claim 13, wherein the processor is configured with processor-executable instructions to perform operations further comprising:
   determining a record identifier enabling location of the determined record in the digital ledger; and
   embedding the determined record identifier in the electronic news item.

19. The computing device of claim 13, wherein the processor is configured with processor-executable instructions to perform operations such that the determined fingerprint is a hash value.

20. A computing device, comprising:
   a memory; and
   a processor coupled to the memory and configured with processor-executable instructions to perform operations comprising:
      obtaining a published electronic news item;
      extracting an embedded fingerprint from the electronic news item;
      identifying one or more portions of the electronic news item usable to calculate a fingerprint of the electronic news item;
      calculating a fingerprint of the electronic news item using the identified one or more portions;
      determining whether the embedded fingerprint and the calculated fingerprint match;
      determining whether the embedded fingerprint matches a fingerprint of the electronic news item stored in a publicly available digital ledger in response to determining that the embedded fingerprint and the calculated fingerprint match; and
      determining that integrity of the news item is verified in response to determining that the embedded fingerprint matches the fingerprint of the electronic news item stored in the digital ledger.

21. The computing device of claim 20, wherein the processor is configured with processor-executable instructions to perform operations such that determining whether the embedded fingerprint matches the fingerprint of the electronic news item stored in a publicly available digital ledger comprises:
   determining a record identifier enabling location of a record in the digital ledger corresponding to the electronic news item; and
   obtaining from the record in the digital ledger the fingerprint of the electronic news item stored in the digital ledger.

22. The computing device of claim 21, wherein the processor is configured with processor-executable instructions to perform operations further comprising:
   determining whether a previous record in the digital ledger is valid based on the fingerprint of the electronic news item and a fingerprint of the previous record; and
   determining that the integrity of the electronic news item is verified in response to determining that the previous record in the digital ledger is valid.

23. The computing device of claim 21, wherein the processor is configured with processor-executable instructions to perform operations further comprising:
   determining a fingerprint of a subsequent record in the digital ledger;
   determining whether the subsequent record in the digital ledger is valid based on the fingerprint of the electronic news item and the determined fingerprint of the subsequent record; and
   determining that the integrity of the electronic news item is verified in response to determining that the subsequent record in the digital ledger is valid.

24. The computing device of claim 21, wherein the processor is configured with processor-executable instructions to perform operations such that the embedded fingerprint, calculated fingerprint, and the fingerprint of the electronic news item stored in the digital ledger are hash values.

* * * * *